May 31, 1927.  
F. R. SMITH ET AL  
1,630,544  
DRIVING OF ROTARY BLOWERS OR PUMPS FOR USE ON INTERNAL COMBUSTION ENGINES  
Filed May 12, 1926

INVENTORS:  
FREDERICK R. SMITH  
SPIRITO M. VIALE  
By Spear, Middleton, Donaldson & Hall  
Attys.

Patented May 31, 1927.

1,630,544

UNITED STATES PATENT OFFICE.

FREDERICK ROBERTSON SMITH AND SPIRITO MARIO VIALE, OF COVENTRY, ENGLAND.

DRIVING OF ROTARY BLOWERS OR PUMPS FOR USE ON INTERNAL-COMBUSTION ENGINES.

Application filed May 12, 1926, Serial No. 108,646, and in Great Britain May 16, 1925.

This invention relates to the driving of superchargers for use on internal combustion engines, and its principal object is to provide a simple method of driving the supercharger blower through concentrically arranged members which will allow for any errors in the location of the engaging parts arising from imperfect concentricity, tolerance during manufacture or assembly, or similar causes, and at the same time will occupy very little space.

The manner of carrying out the invention is illustrated in the accompanying drawings, which show only so much of the driving and driven members as is necessary to understand the invention.

Figure 1:
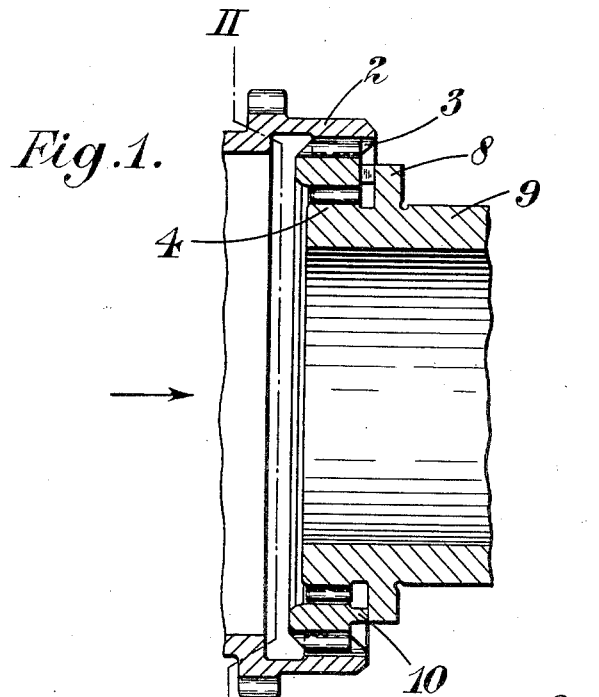
Figure 1 is a fragmentary axial section.
Figure 2:
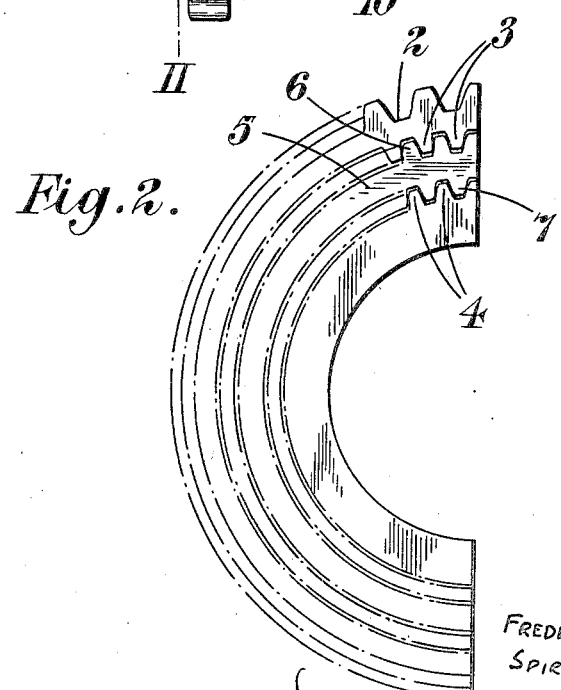
Figure 2 is a fragmentary end view as seen in the direction of the arrow in reference to the section line II—II of Figure 1.

The method of carrying out the invention here shown is particularly intended for use with the blower driving mechanism, in which the blower is in the form of a fan and a geared-up connection is provided between the engine shaft and the blower shaft, but it is not limited thereto. In the foregoing arrangement, one element of the gear train is provided with a projecting circumferential flange, such as 2 in the present example. This is internally toothed at 3 and constitutes a dog clutch adapted, when the blower is bolted to the engine casing, to surround a pinion 4 also constituting a dog clutch fast on the engine crankshaft.

This pinion 4 is smaller in diameter than the internally toothed wheel 3 which surrounds it, their respective teeth, however, being in the same planes. An annular space thus exists between the teeth of these two wheels, and in this space is located a ring 5 which is toothed externally at 6 and internally at 7 to engage the respective teeth of the two gear wheels 3 and 4, and furthermore it is so formed that it has a certain amount of "float" which enables it to accommodate itself to any want of concentricity of the two wheels. A collar or flange 8 either removable, or fixed as shown, is preferably provided upon the hub 9 of the externally toothed wheel 4 or upon the engine crankshaft adapted to locate the toothed ring 5 endwise in position. The latter may have an annular ridge 10 formed on it to engage the flange 8. There may also be a removable collar corresponding to 8, on the opposite side of the ring 5.

From the foregoing it will be seen that a very simple driving connection is provided for the blower which enables the latter to be very easily attached to and removed from the engine casing, and avoids any difficulty in assembling if the blower shaft and the engine shaft are not in accurate alignment. Also, the construction is mechanically very strong, involves no loose fastening devices, enables the connection to be made very easily when the blower is bolted directly to the engine, and furthermore the float given to the connecting element avoids any binding or lost energy through friction if the concentricity of the two members is not initially perfect.

What we claim as our invention and desire to secure by Letter Patent of the United States is:—

In the driving of a rotary blower for use as a supercharger on an internal combustion engine, the combination of a driving member and a driven member free of engagement with one another, internally arranged teeth on one of said members and externally arranged teeth on the other member in the same radial planes as the internal teeth, a rigid connecting ring free to float radially in the plane of the teeth on said driving and driven members, and teeth formed externally and internally upon said ring adapted to engage respectively with the teeth on the driving and driven members, substantially as set forth.

In testimony whereof we have signed our names to this specification.

FREDERICK ROBERTSON SMITH.
SPIRITO MARIO VIALE.